United States Patent [19]
Schmick

[11] Patent Number: 6,088,920
[45] Date of Patent: Jul. 18, 2000

[54] CABLE CUTTER WITH INSERT BLADES

[75] Inventor: Daniel G. Schmick, Sturgis, Mich.

[73] Assignee: Midwest Tool and Cutlery Company, Sturgis, Mich.

[21] Appl. No.: 09/185,309

[22] Filed: Nov. 3, 1998

[51] Int. Cl.[7] .................................................. B26B 13/02
[52] U.S. Cl. .............................................. 30/252; 30/193
[58] Field of Search ........................... 30/252, 191, 193, 30/260, 245

[56] References Cited

U.S. PATENT DOCUMENTS

| | | |
|---|---|---|
| 1,446,540 | 2/1923 | Bernard . |
| 1,636,088 | 7/1927 | Bernard . |
| 2,295,385 | 9/1942 | Connors . |
| 2,655,722 | 10/1953 | Klenk . |
| 2,801,468 | 8/1957 | Anderson ............................. 30/260 X |
| 4,112,791 | 9/1978 | Wiener . |
| 4,439,923 | 4/1984 | Scranton ................................. 30/252 |
| 4,835,862 | 6/1989 | Phillips . |
| 5,003,695 | 4/1991 | Lipscomb et al. . |
| 5,898,998 | 5/1999 | Deville ................................. 30/252 X |

*Primary Examiner*—Douglas D. Watts
*Attorney, Agent, or Firm*—Frank H. Foster; Kremblas, Foster, Millard & Pollick

[57] ABSTRACT

A cable cutting tool with high hardness insert blades inserted between pivotably mounted levers. The levers are pivotably mounted to hand-grippable handles. The levers have jaws with a gap formed between inner facing surfaces thereof. The gap provides space for insertion of the insert blades.

3 Claims, 6 Drawing Sheets

Fig. 2
Fig. 3
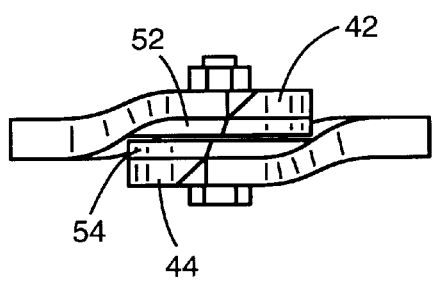
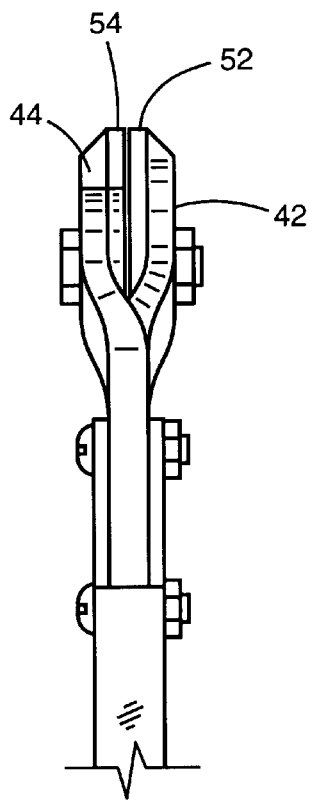
Fig. 4
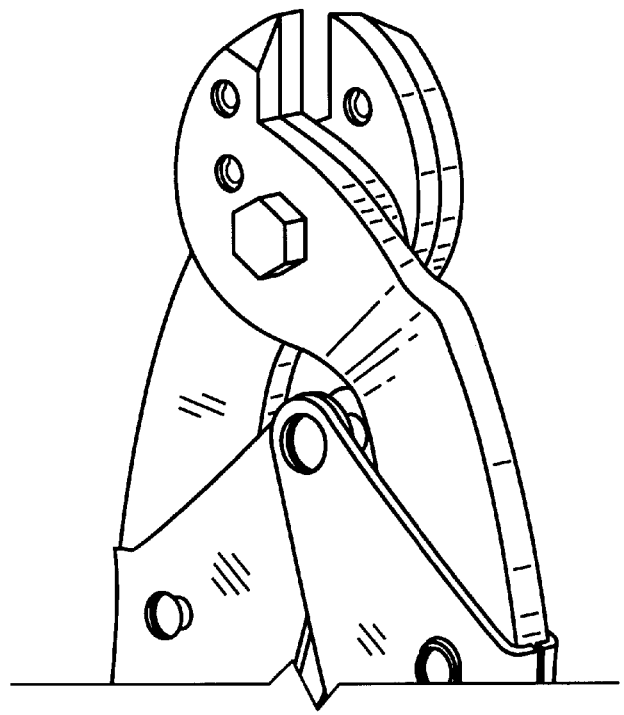

6,088,920

CABLE CUTTER WITH INSERT BLADES

BACKGROUND OF THE INVENTION

1. Field of the Invention

The invention relates to hand tools, and more particularly to hand cutting tools actuated by squeezing hand-grippable handles together to bring cutting surfaces in shearing action past one another.

2. Description of the Related Art

Hand cutting tools are used to cut wire, cable and sheet material. Cutting tools can simply consist of a pair of elongated handles that are pivotably mounted together at an intersection point near one end. A sharpened cutting surface of one handle is forced against a blunt anvil on the other handle, thereby cutting a workpiece that is placed between the two surfaces. Alternative cutting actions can be used, including shearing with scissoring action. These simple tools typically are made of forged high carbon steel, which experiences significant wear if harder materials, such as aluminum or copper, are cut.

More recently, compound linkages have been used on cutting tools to permit a greater force to be applied to the workpiece upon squeezing of the handles. With such compound linkages, the distance the cutting surfaces move is less than the distance the handles move. However, the leverage provided by the linkage applies a much greater force to the workpiece than the simple hinged tools.

With the significantly higher force of compound linkages and the corresponding ability to cut harder materials comes an increase in wear to the cutting surfaces. The use of materials for the cutting surfaces that do not wear as severely increases the cost of the tool significantly, because the entire tool, or at least a significant portion of it, must be made of the harder, more expensive material. Therefore, the need exists for a hand cutting tool that has a significantly increased useful life, but which is still economically feasible to manufacture.

SUMMARY OF THE INVENTION

The invention is a cable cutter that includes a first handle and a second handle. The handles are pivotably mounted together at a pivot point into a hand-grippable configuration that can be pivoted together by hand. The cable cutter comprises a first lever pivotably mounted to the first handle near one lever end. The first lever has a jaw near an opposite lever end, and the jaw has an inner surface. A second lever is pivotably mounted to the second handle near one lever end. The second lever has a jaw near an opposite lever end. The jaw has an inner surface facing the inner surface of the first lever.

The inner surfaces of the jaws are spaced apart to form a gap of predetermined gap width. A first insert blade is rigidly mounted to the jaw of the first lever, and is seated against the inner surface of the first lever in the gap. A second insert blade is rigidly mounted to the jaw of the second lever, and is seated against the inner surface of the second lever in the gap. The gap provides space for the insert blades to be mounted to the jaws.

The insert blades are preferably made of a harder material than the rest of the tool, which provides wear resistance where the cutting occurs. The cost of the insert blades is lower than if the entire tool, or even a significant portion of it, were made of the more expensive, harder material.

BRIEF DESCRIPTION OF THE DRAWINGS

FIG. 2 is a side view along the line 2—2 of FIG. 1.

FIG. 3 is a top view along the line 3—3 of FIG. 1.

FIG. 4 is a view in perspective illustrating the preferred embodiment of the present invention.

Figure 1:
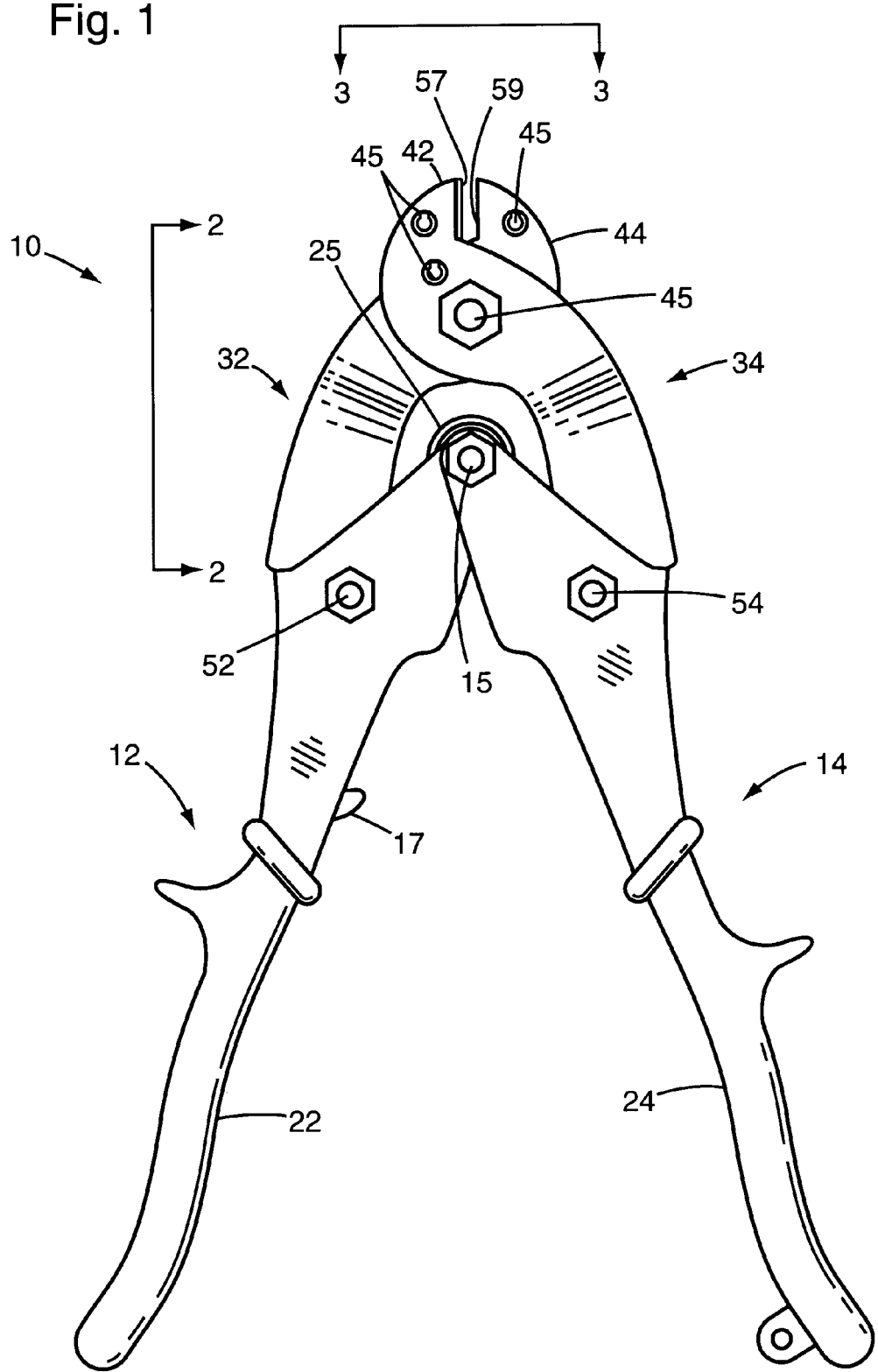
FIG. 1 is a front view illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

BRIEF DESCRIPTION OF THE PREFERRED EMBODIMENT

Figure 5:
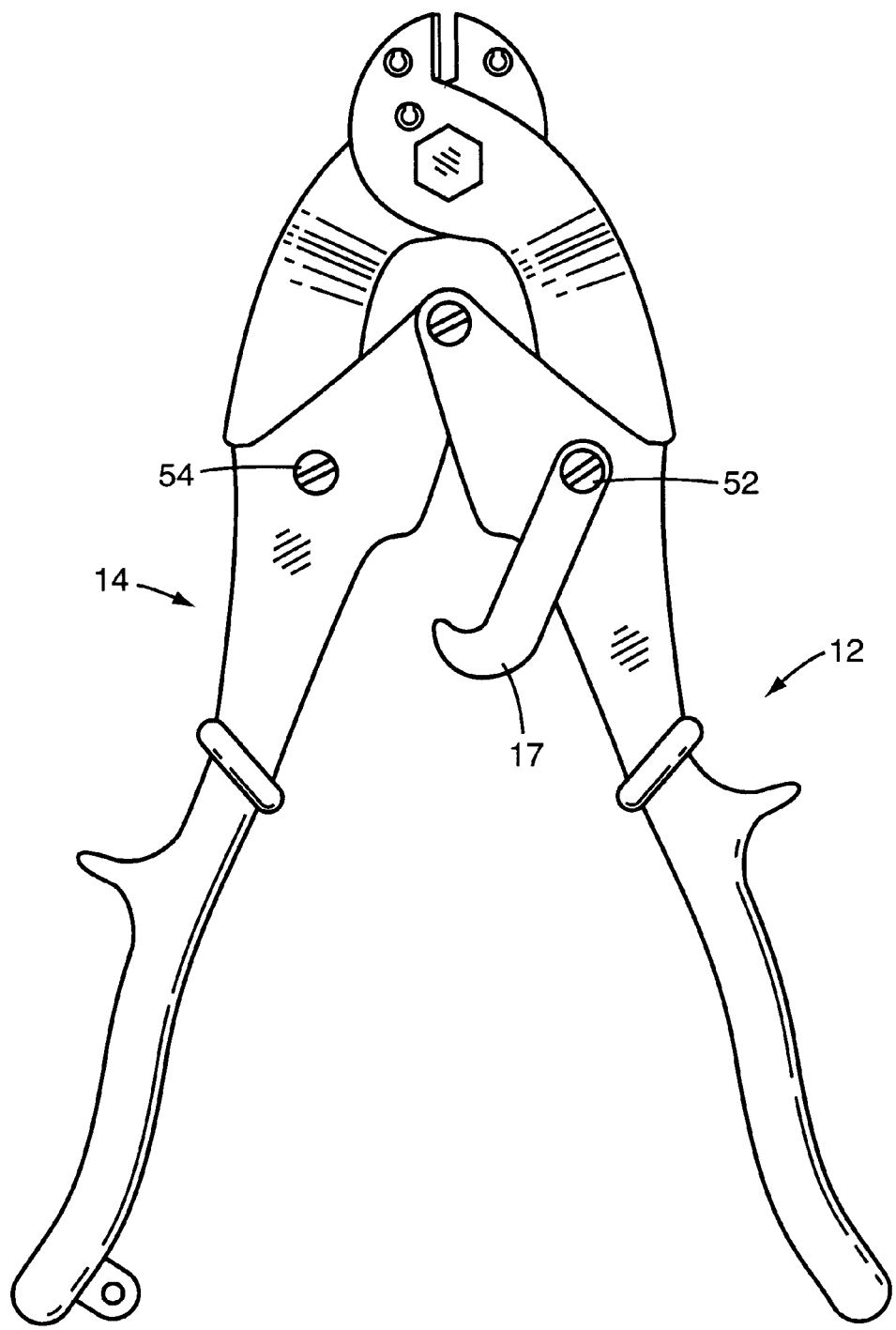
FIG. 5 is a rear view illustrating the preferred embodiment of the present invention.
Figure 6:
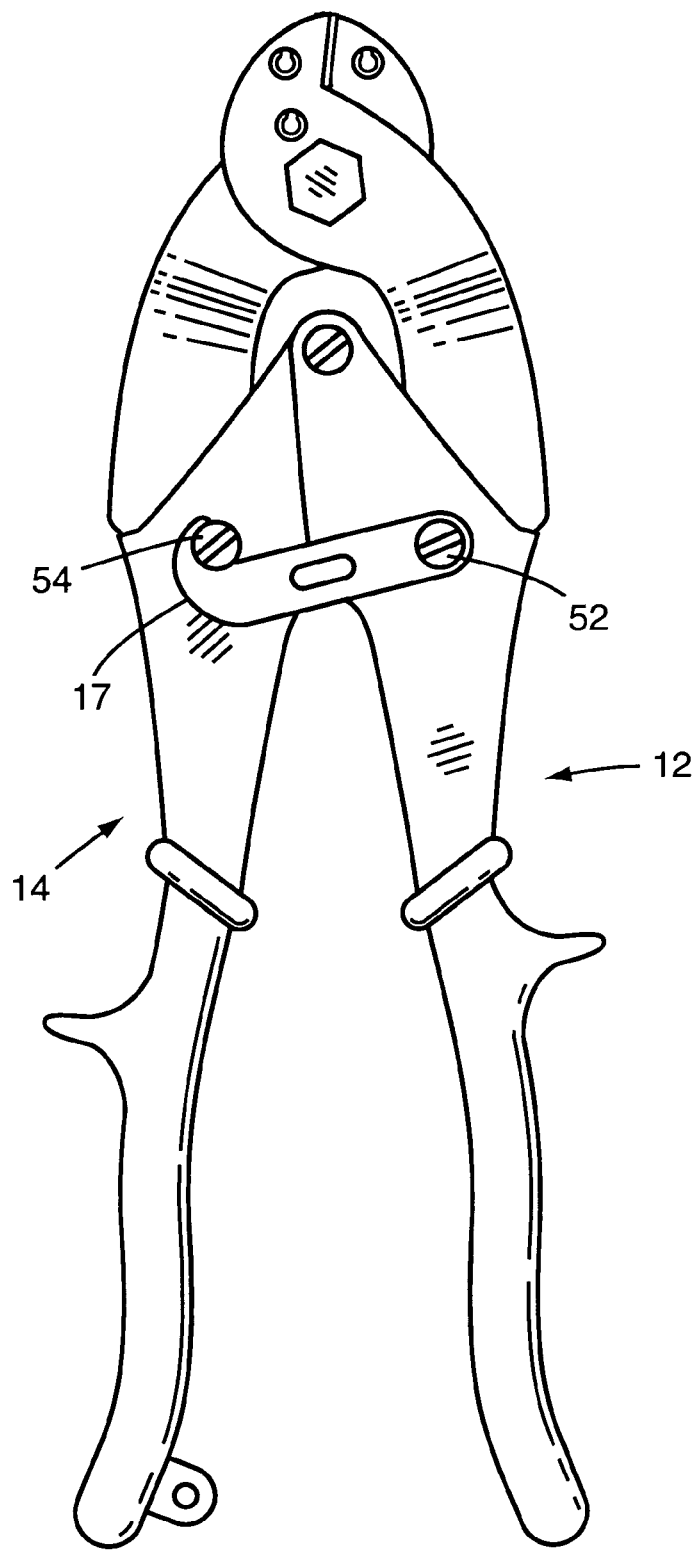
FIG. 6 is a rear view illustrating the preferred embodiment of the present invention in a closed and latched position.

The preferred cable cutter 10 has a pair of handles 12 and 14 that are pivotably mounted together by a fastener, such as the handle pivot screw 15, extending through the engaged ends of the handles 12 and 14. High-friction hand grips 22 and 24 cover the lower portion of the handles 12 and 14 to provide user comfort and a secure grip on the handles 12 and 14. A conventional latch 17, shown in FIG. 5, extends from the handle 12 to latch onto the screw 54 in the handle 14, as shown in FIG. 6.

The handles 12 and 14 are hand-grippable, meaning that an average person can grasp the handles 12 and 14 between the thumb and opposed fingers, or alternatively the heel of the hand and opposed fingers, and squeeze the handles together. The average person can generate a sufficient force to pivot one handle relative to the other about the handle pivot screw 15.

The levers 32 and 34 are pivotably mounted together by a fastener, such as the lever pivot screw 35, extending through the overlapped midsections of the levers 32 and 34. A coil spring 25, for returning the cutting tool from the closed to the opened position, encircles the lever pivot screw 35, and its ends seat against the inner edges of the levers 32 and 34. The jaws 42 and 44 are positioned at one end of the levers 32 and 34.

At the opposite ends from the jaws 42 and 44, the levers are pivotably mounted to the handles 12 and 14. The ends of the levers 32 and 34 are matingly inserted into the ends of the handles 12 and 14, and fasteners, such as the screws 52 and 54, extend through the levers 32 and 34 and the handles 12 and 14, respectively.

The connection between the levers and the handles 12 and 14 results in a compound linkage configuration. The squeezing force applied to the handles hinges the handles about the handle pivot screw 15, displacing the ends of the levers 32 and 34 to which the handles are pivotably mounted. The pivotably mounted ends of the levers 32 and 34 are displaced inwardly the same distance as the proximal ends of the handles. However, these lever ends are displaced inwardly a much smaller distance than distal ends of the handles. This is due to the positioning of the handle pivot screw 15, which functions as a fulcrum, at a point that is not equidistant between the opposite ends of the handles. Offsetting of the lever pivot screw 35 causes the jaws 42 and 44 to be displaced even less than the opposite ends of the levers.

The compound linkage configuration used in the present invention is conventional. However, there are new structural features that provide the cable cutter 10 with significant advantages over the conventional cutting tools. Referring to FIGS. 2 and 3, the jaws 42 and 44 have inner, facing surfaces that are spaced apart, forming a gap. This gap permits an insert blade 52 to be mounted to the jaw 42, and an insert blade 54 to be mounted to the jaw 44.

Figure 7:
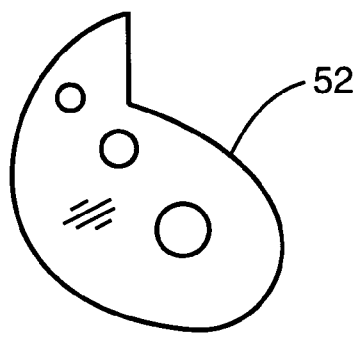
FIGS. 7 and 8 are front views illustrating the preferred insert blades.
Figure 8:
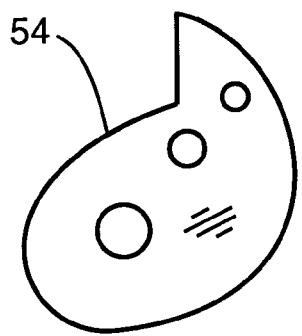

The insert blades 52 and 54, shown in FIGS. 7 and 8, are preferably mounted to the jaws by roll pins 45, shown in FIG. 1, inserted through aligned apertures formed in the jaws and the insert blades. Additionally, the lever pivot screw 35 extends through both insert blades. Of course, other screws, rivets or any equivalent fastener could be substituted for the roll pins 45 or the lever pivot screw 35.

The insert blades are mounted with their sharp edges 57 and 59 facing in substantially opposite directions so that as the handles 12 and 14 are squeezed, the sharp edges 57 and 59 pass by each other in very close proximity, preferably in contact, providing a shearing action. The insert blades are preferably made of a harder material than the handles and levers, such as M2 tool steel. This keeps the cost lower than if the entire tool were made of the high alloy material, but provides a cutting surface of harder material where it is necessary. The remainder of the tool is preferably made of high carbon steel.

The gap in which the insert blades are positioned extends from the inner surface of the jaw 42 to the inner surface of the jaw 44 as best seen in FIG. 2. This gap provides space for the insert blades 52 and 54, which could not be added to the tool without the gap.

The lever pivot screw 35 extends through the insert blades and jaws and when it is fully tightened, seats the inner surfaces of the jaws against the outer surfaces of the insert blades. This in turn seats the inner surfaces of the insert blades against each other, preferably in firm contact. During cutting, the inner surfaces of the insert blades slide against each other and the sharp edges of the insert blades slide past each other, providing a shearing action for cutting the workpiece. The harder, higher alloy insert blades that perform the cutting resist wear.

In order to be able to mount the insert blades on the inner surfaces of the jaws 42 and 44, the gap formed between the inner surfaces of the jaws must have sufficient width. The predetermined width is substantially equal to the sum of the thicknesses of the insert blades 52 and 54. Each of the insert blades 52 and 54 is preferably approximately one-eighth inch thick, which results in a preferred gap approximately one-quarter inch wide.

There are many ways to provide a gap for the insert blades 52 and 54 between the jaws 42 and 44. In the preferred embodiment, the levers 32 and 34 are bent and have locally thinner regions to provide the gap at least at the jaws 42 and 44. This can best be seen in FIGS. 2, 3 and 4. The gap extends from the tops to the bottoms of the insert blades 52 and 54 although it could alternatively extend farther.

Of course, alternatives to bending and thinning of the levers 32 and 34 are anticipated. For example, it is foreseeable that the levers could be only bent or only thinned, and not both. Any manner of forming a gap between the lever members is contemplated to be sufficient for making space for the insert blades.

An additional advantage of the insert blades is that they can be removed and replaced if they break, corrode or wear out. The roll pins 45 can merely be pushed out, and the lever pivot screw 35 removed, and this will permit removal and replacement of the insert blades.

Figure 9:
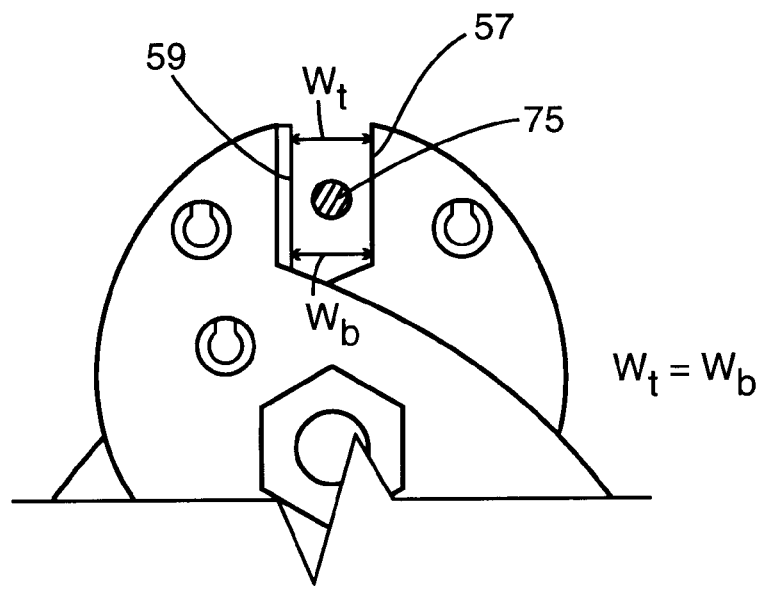
FIGS. 9, 10 and 11 are rear views illustrating three positions in the sequence of squeezing the jaws of the preferred cable cutter together.
Figure 10:
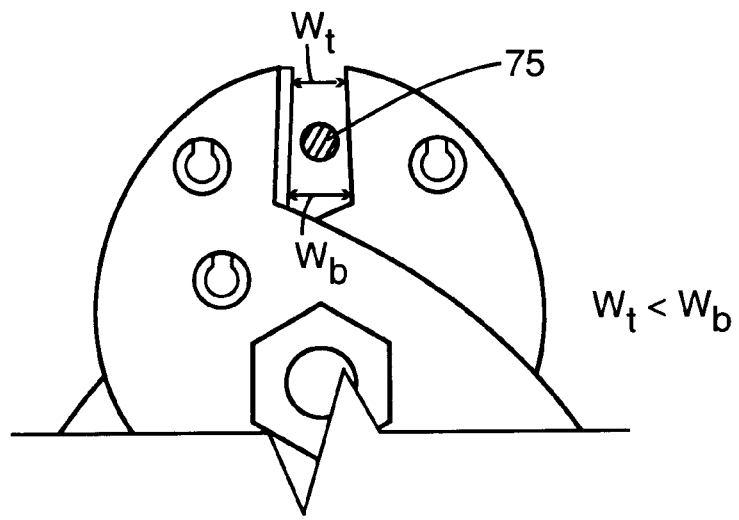
Figure 11:
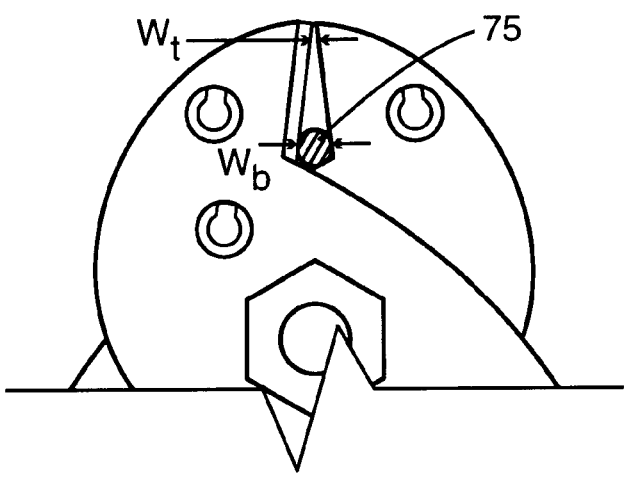

An additional structural feature of the present invention is the angle of the sharp edges of the insert blades during cutting. The progressive movement of the sharp edges 57 and 59 is shown in FIGS. 9, 10 and 11. In FIG. 9, the width of the opening between the sharp edge 57 and the sharp edge 59 is essentially equal at the top and the bottom of the opening. Stated simply, $W_t=W_b$. This relationship permits the workpiece, such as a piece of wire 75, to enter the opening between the sharp edges, whereupon the handles are squeezed, closing the gap.

Upon squeezing of the handles, the width of the top of the opening decreases more rapidly than the width of the bottom of the opening. At some point during closing, the width of the top becomes less than the width of the bottom: $W_t<W_b$. This is shown in FIG. 10. Eventually, the width of the top becomes significantly less than the width of the bottom, which forces the wire 75 to the bottom of the opening as shown in FIG. 11. In FIG. 11, $W_t<<W_b$. As the opening closes from the top to the bottom, the wire 75 is forced to the bottom of the opening, which avoids pushing the wire 75 out of the opening as it is cut. Such an advantage arises from the shape of the tool components and the position of the lever pivot screw 35.

While certain preferred embodiments of the present invention have been disclosed in detail, it is to be understood that various modifications may be adopted without departing from the spirit of the invention or scope of the following claims.

What is claimed is:

1. A cable cutter including a first handle and a second handle hingedly mounted together into a hand-grippable configuration, the cable cutter comprising:

(a) a first lever pivotably mounted to the first handle near one lever end, the first lever having a first jaw near an opposite lever end, the first jaw having peripheral edges and an inner surface;

(b) a second lever pivotably mounted to the second handle near one lever end, the second lever having a second jaw near an opposite lever end, the jaw having peripheral edges and an inner surface facing the inner surface of the first jaw and spaced from the inner surface of the first jaw to form a gap of predetermined gap width;

(c) a first insert blade rigidly mounted to the first jaw, the first insert blade having a first surface seated against the inner surface of the first jaw in the gap, a second, oppositely facing surface and peripheral edges that extend at least to the peripheral edges of the first jaw;

(d) a second insert blade rigidly mounted to the second jaw, the second insert blade having a first surface seated against the inner surface of the second jaw in the gap, and a second, oppositely facing surface seated against the second surface of the first insert and peripheral edges that extend at least to the peripheral edges of the second jaw; and (e) a pivot pin extending through both jaws and both insert blades;

wherein only the second surfaces of the insert blades remain in contact with each other in a cutting region as the handles are articulated to pivot the levers and insert blades about the pivot pin, thereby causing the second surfaces of the insert blades to slide against each other in a scissoring action.

2. A cable cutter in accordance with claim 1, wherein the first and second insert blades are substantially harder than the levers.

3. A cable cutter in accordance with claim 1, wherein said gap width is substantially equal to the sum of the thicknesses of the insert blades.

* * * * *